United States Patent
Hojna

(10) Patent No.: US 7,011,780 B2
(45) Date of Patent: Mar. 14, 2006

(54) METHOD FOR PRODUCING A MONOLITHIC FRONT AIR DEFLECTOR

(75) Inventor: Joseph J Hojna, Sterling Hts., MI (US)

(73) Assignee: General Motors Corporation, Detroit, MI (US)

( * ) Notice: Subject to any disclaimer, the term of this patent is extended or adjusted under 35 U.S.C. 154(b) by 79 days.

(21) Appl. No.: 10/853,440

(22) Filed: May 25, 2004

(65) Prior Publication Data

US 2004/0217515 A1 Nov. 4, 2004

Related U.S. Application Data

(62) Division of application No. 10/178,286, filed on Jun. 24, 2002, now Pat. No. 6,874,842.

(51) Int. Cl.
*B29C 45/16* (2006.01)
(52) U.S. Cl. ................... 264/238; 264/250; 264/255; 264/328.8
(58) Field of Classification Search ............... 264/250, 264/255, 238, 328.8
See application file for complete search history.

(56) References Cited

U.S. PATENT DOCUMENTS

| | | | | |
|---|---|---|---|---|
| 5,403,647 A | * | 4/1995 | Kaneishi et al. | 428/156 |
| 6,000,814 A | * | 12/1999 | Nestell et al. | 362/267 |
| 6,638,467 B1 | * | 10/2003 | Yamamoto | 264/263 |

FOREIGN PATENT DOCUMENTS

| | | | |
|---|---|---|---|
| JP | 3-112652 | * | 5/1991 |
| JP | 4-246520 | * | 9/1992 |
| JP | 4-272815 | * | 9/1992 |

* cited by examiner

*Primary Examiner*—Edmund H. Lee
(74) *Attorney, Agent, or Firm*—Laura C. Hargitt

(57) ABSTRACT

An air deflector for attachment to a lower surface of a vehicle includes a first portion and a second portion attached to and extending downwardly from the first portion. The first portion is adapted to be attached to a lower surface of the vehicle and is formed of a first material having a first durometer value. The second portion is formed of a second material different from the first material. The second portion has a second durometer value less than the first durometer value.

6 Claims, 2 Drawing Sheets

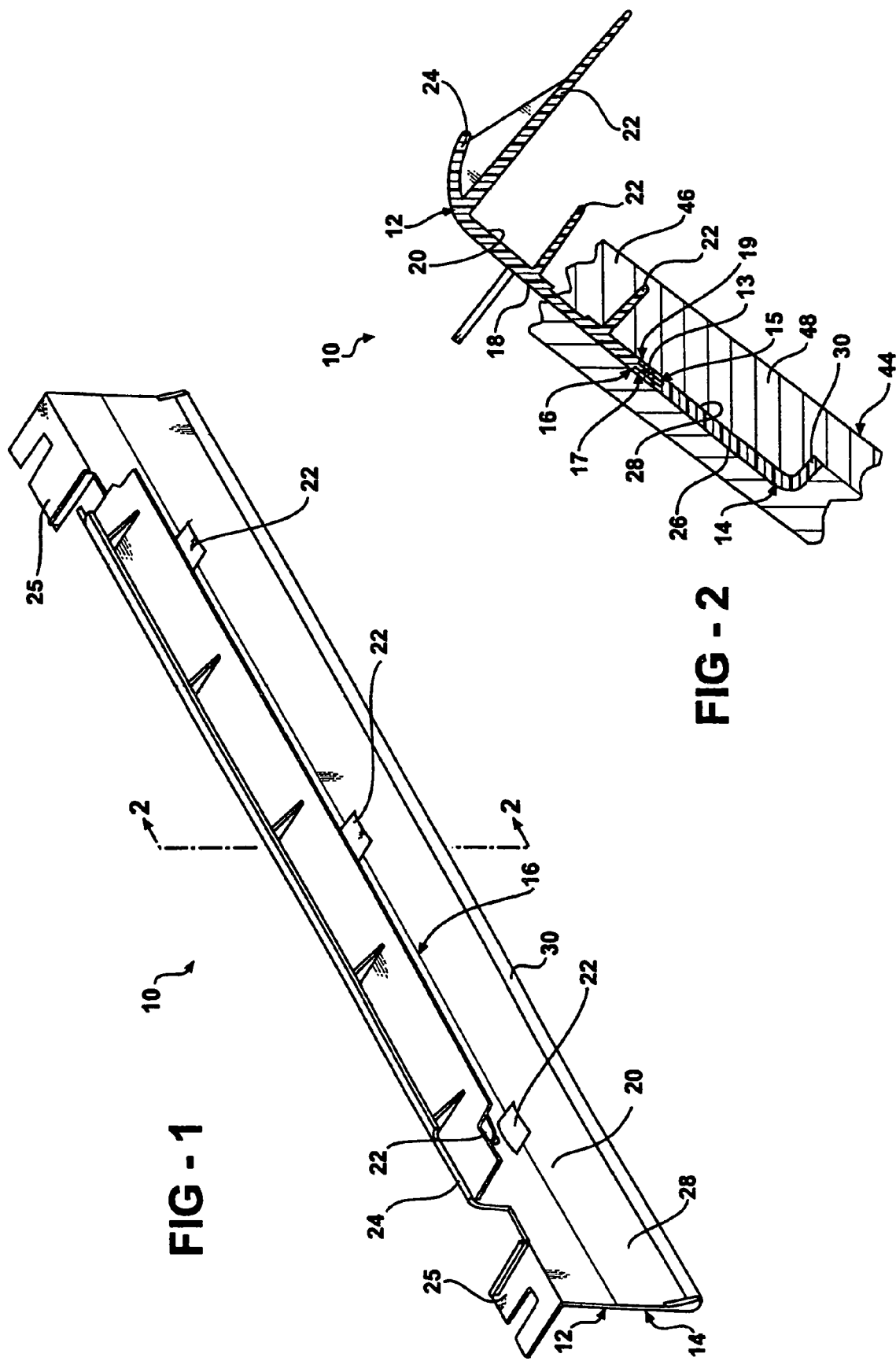

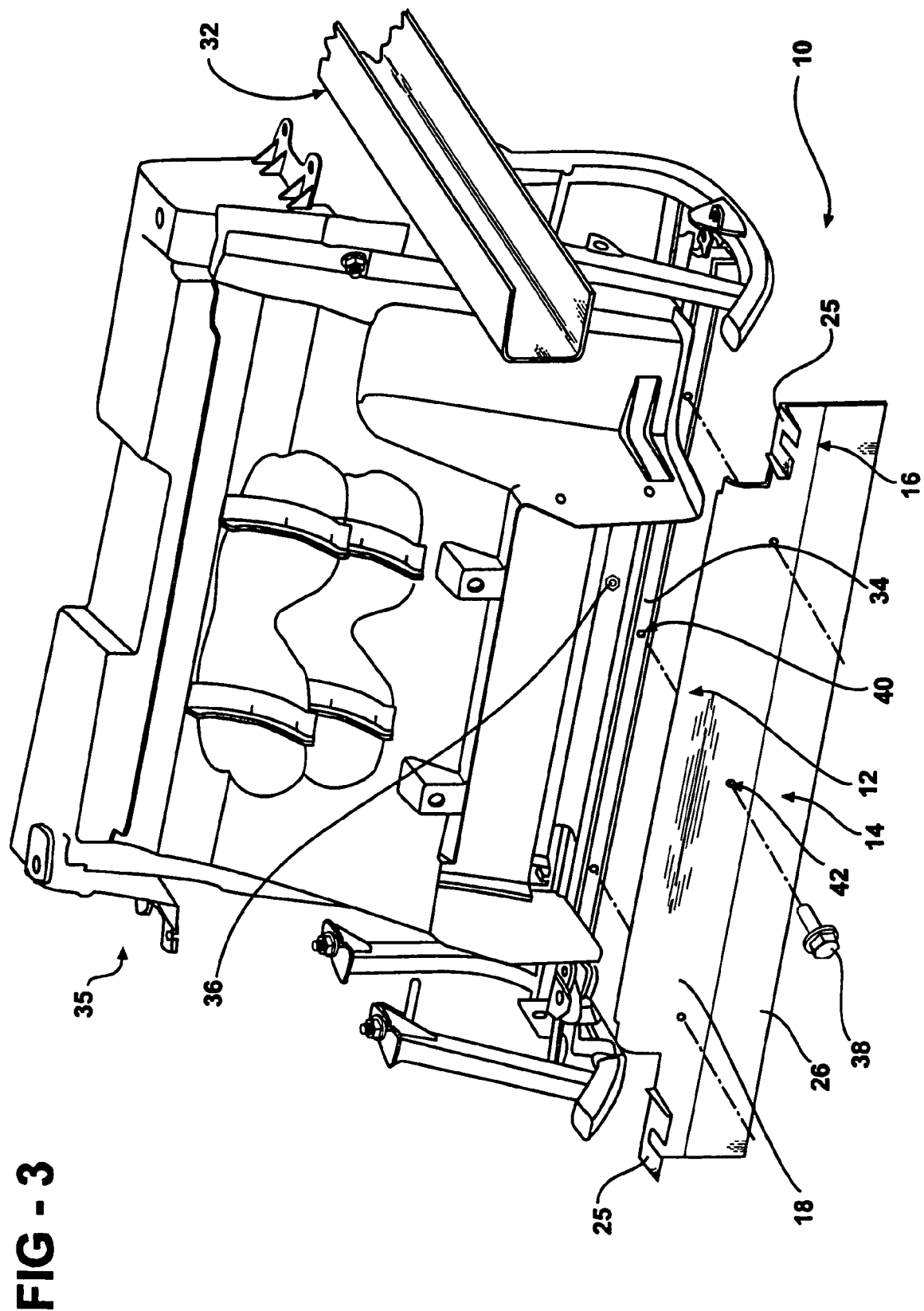

METHOD FOR PRODUCING A MONOLITHIC FRONT AIR DEFLECTOR

RELATED APPLICATION

This application is a division of U.S. Ser. No. 10/178,286 filed on Jun. 24, 2002, now U.S. Pat. No. 6,874,842.

BACKGROUND OF THE INVENTION

The present invention relates generally to air deflectors for automotive vehicles and, in particular, to an air deflector for attachment to a lower surface of a vehicle and a method for producing the air deflector.

Air dams, or air deflectors, for attachment to surfaces of an automobile body are well known. Air deflectors are typically a rigid panel installed below the front bumper on most modern vehicles to direct airflow thereby reducing drag and lift and increasing heat exchanger cooling. The air deflector diverts air flowing under the vehicle away from suspension and frame components thus reducing the drag of the vehicle. In addition, the pressure behind the air deflector is decreased, which aids the cooling flow across the radiator. The deflector also functions to reduce lift at the front of the vehicle.

A typical prior art air deflector assembly design for vehicles is a single piece design. Some vehicle designs, however, require a multi-piece air deflector to accommodate vehicle air flow dynamics. The multi-piece air deflector includes a three piece design consisting of upper and lower hard plastic material panels joined together with a spring-loaded hinge device. The spring-loaded hinge is used for deflection purposes of the lower portion when approaching and/or going over objects such as curbs, parking bumpers or transitions between roads and driveways. The assembly is fastened to a skid bar on the underside of the vehicle with nuts and bolts.

This type of prior art air deflector assembly, however, has proved to be extremely costly to manufacture. The prior art assembly also disadvantageously creates a disturbing noise when in contact with curbs or driveways, and there is an excessive deflection of the lower portion at high speeds resulting in loss of cooling and aerodynamic characteristics. In addition, the prior art assembly has a high warranty cost because of both the high cost and the high frequency of replacing broken air deflectors.

It is desirable, therefore, to provide an air deflector assembly for an automotive vehicle that is cost-effective to produce, does not create disturbing noises when in contact with curbs or driveways and does not deflect excessively at high speeds.

SUMMARY OF THE INVENTION

The present invention concerns an air deflector for attachment to a lower surface of a vehicle. The air deflector includes a first portion formed of a first plastic material having a first durometer value and is adapted to be attached to a lower surface of a vehicle. The air deflector also includes a second portion attached to and extending downwardly from the first portion. The second portion is formed of a second material that is different from said first material and having a second durometer value that is less than the first durometer value. Preferably, the first material is a hard polypropylene plastic material and the second material is a softer, rubberized plastic material, such as 101-80 durometer thermoplastic elastomer (TPE). Preferably, the air deflector according to the present invention is used for a front center air deflector, where the first portion is adapted to be mounted to a skid bar on a lower surface of the vehicle.

The present invention relates to a unique design utilizing two distinctive plastic compounds in an integral air deflector to enhance air deflector function and performance. The present invention solves the shortcomings of the prior art air deflector assembly by providing a one-piece injection molded dual durometer front center air deflector assembly. The present invention provides many advantages over the prior art including, but not limited to, a substantially lower cost design, and the second portion of the air deflector is a softer durometer material and is barely audible when coming in contact with curbs or driveways. The second portion of the air deflector also has substantially less deflection than the lower portion of the prior art deflector assembly, resulting in better airflow and aerodynamic characteristics. Furthermore, because of the characteristics of the second material, it is anticipated that the present invention will reduce warranty claims substantially.

The novelty of the present invention is the utilization of two distinctive plastic compounds in an integral one-piece injection molded air deflector to provide rigid mounting to the vehicle, reduced incline and curb scrub noise, and consistent vehicle aerodynamic characteristics.

The air deflector according to the present invention is preferably produced by an injection molding method, as follows. The first portion of the air deflector having a first durometer value is formed first, preferably by an injection molding. The first portion is also preferably separated from the second portion molding area in the first shot molding process by a separator that is known in the art as a blade. The blade is then removed and the second portion of the air deflector made of a softer durometer is shot into the mold, thereby fusing the first portion and the second portion together with a tongue and groove joint design.

DESCRIPTION OF THE DRAWINGS

The above, as well as other advantages of the present invention, will become readily apparent to those skilled in the art from the following detailed description of a preferred embodiment when considered in the light of the accompanying drawings in which:

FIG. 1 is a perspective view of an air deflector in accordance with the present invention;

FIG. 2 is cross-sectional view taken along line 2—2 of the air deflector shown in FIG. 1; and FIG. 3 is a perspective view of the air deflector of FIG. 1 shown adjacent a lower surface of a vehicle.

DESCRIPTION OF THE PREFERRED EMBODIMENT

Referring now to FIGS. 1 and 2, an air deflector according to the present invention is indicated generally at 10. The air deflector 10 includes a first portion 12 and a second portion 14 attached thereto and extending downwardly therefrom to form a generally vertical plane. The first portion 12 is horizontally elongated and is adapted to be attached to a lower surface of a vehicle, outlined in more detail below. The first portion 12 is preferably constructed of a first material having a first durometer value. The first material is preferably a plastic molding material such as polypropylene that has a high durometer value. The high durometer value indicates that the first material has a high hardness property. Preferably the first material is hard and durable enough to be mounted on the lower surface of the vehicle. The second portion 14 is preferably constructed of a second material having a second durometer value. The second material is different than the first material and the second durometer value is less than the first durometer value. The second material is preferably a plastic molding material such as a thermoplastic elastomer (TPE) that has a low durometer value. The low durometer value indicates that the second material has a low hardness property. Preferably the second material is soft and pliable enough to act as a sacrificial material when the second portion 14 strikes the ground (not shown) during operation of the vehicle. The first portion 12 and the second portion 14 are joined at a seam 16, preferably by a tongue and groove connection, whereby an upper edge 17 of the second portion 14 includes a groove 15 that engages with a tongue 13 extending downwardly from a lower edge 19 of the first portion 12. Alternatively, other means are used to join the first portion 12 and the second portion 14 along the seam 16.

The first portion 12 includes an outer surface 18 and an inner surface 20. The inner surface 20 includes a plurality of projections 22 extending outwardly therefrom for facilitating attachment to a skid plate, such as a skid plate 34 in FIG. 3, on a lower surface of a vehicle (not shown). An upper portion 24 of the first portion 12 is curved inwardly to facilitate directing the airflow by the air deflector 10. The outer surface 18 of the first portion 12 is smooth in order to facilitate directing the airflow around the vehicle. A tab 25 on each opposite end of an upper edge of the upper portion 12 for facilitating attachment with the skid plate extends outwardly in an opposite direction from the projections 22.

The second portion 14 includes an outer surface 26 and an inner surface 28. The outer surface 26 is smooth in order to facilitate directing the airflow around the vehicle. A lower portion 30 of the second portion 14 is curved inwardly to facilitate directing the airflow by the air deflector 10.

Referring now to FIG. 3, the air deflector 10 is shown adjacent a vehicle frame, indicated generally at 32. The vehicle frame 32 includes the skid plate 34 attached to a bottom surface thereof. The skid plate 34 and the frame 32 are shown adjacent a radiator baffle assembly and support, indicated generally at 35. The radiator baffle assembly and support 35 is attached to an upper surface of the skid plate 34. The skid plate 34 is operable to attach to the air deflector 10 by a plurality of nuts 36 and bolts 38 extending through a plurality of apertures 40 on the skid plate 34 and a plurality of apertures 42 on the air deflector 10. Preferably the projections 22 on the inner surface 20 cooperate with projections (not shown) on the frame 32 or the skid plate 34 to facilitate attachment of the air deflector 10 to the skid plate 34.

The air deflector 10 is produced by the steps of providing the first plastic molding material and forming the first portion 12 from the first molding material. The next step is providing the second plastic material and forming the second portion 14 from the second molding material. The next step is joining the first portion 12 to the second portion 14 to form the air deflector 10.

Preferably, the steps outlined above for producing the air deflector 10 are a part of an injection molding process whereby the first material is injected into a first molding area 46 of a mold 44 and the first portion 12 is preferably separated in the first shot molding process from a second molding area 48 of the mold 44, best seen in FIG. 2, by a separator (not shown) that is known in the art as a blade. The blade is then removed and the second material is injected into the second area 48 of the same mold 44 thereby fusing the first portion 12 and the second portion 14 together to form the air deflector 10.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A method for producing a monolithic front air deflector, the air deflector adapted to be attached to a lower surface of an automotive vehicle and to deflect air as the vehicle moves forward, comprising the steps of:
  a) providing a first plastic molding material;
  b) forming a first portion of the air deflector from said first plastic molding material, said first portion having a first durometer value and adapted to be attached to said lower front surface of said vehicle;
  c) providing a second plastic molding material different than said first plastic molding material;
  d) forming a second portion of the air deflector from said second plastic molding material, said second portion having a second durometer value less than said first durometer value; and
  e) fusing said first portion to said second portion to form the air deflector wherein said second portion is fused to said first portion to prevent detachment therefrom and movement therebetween and extend downwardly from said first portion.

2. The method according to claim 1 wherein said first plastic molding material is polypropylene.

3. The method according to claim 1 wherein said second molding material is a low durometer thermoplastic elastomer.

4. The method according to claim 1 wherein said steps are performed as part of an injection molding process.

5. The method according to claim 1 including steps of providing a mold having a first molding area and a second molding area; separating said first molding area from said second molding area; performing said step b. in said first molding area; exposing said first molding area to said second molding area; performing said step d. in said second molding area; performing said step e.; at an interface of said first molding area with said second molding area; and removing the air deflector from the mold.

6. The method according to claim 5 including forming a tongue on said first portion during said step b. and forming a groove in said second portion during said step d., said tongue and said groove cooperating to join said first portion to said second portion.

* * * * *